United States Patent
Bell

[15] 3,668,926
[45] June 13, 1972

[54] APPARATUS FOR INDICATING TORQUE APPLIED TO PIPE ROTATED BY A ROTARY TABLE

[72] Inventor: Leo A. Bell, Villa Maud, Kappara Road, San Gwann, Malta

[22] Filed: Sept. 9, 1970

[21] Appl. No.: 70,660

[52] U.S. Cl. .................................................73/136 R, 73/140
[51] Int. Cl. ...........................................................G01l 3/14
[58] Field of Search...........................................73/136 R, 140

[56] References Cited

UNITED STATES PATENTS

| | | | |
|---|---|---|---|
| 2,593,000 | 4/1952 | Bayless | 73/136 D |
| 2,582,784 | 1/1952 | Lumb et al. | 73/136 R |
| 2,718,782 | 9/1955 | Steinbruegge et al. | 73/136 R |
| 1,789,862 | 1/1931 | Bricken | 73/136 B X |
| 2,061,896 | 11/1936 | Chilton | 73/136 X R |
| 3,176,510 | 4/1965 | Kimmell et al. | 73/144 |

FOREIGN PATENTS OR APPLICATIONS

| | | | |
|---|---|---|---|
| 376,054 | 5/1907 | France | 73/136 R |
| 6,361 | 7/1908 | Great Britain | 73/136 R |
| 1,919,398 | 10/1969 | Germany | 73/136 D |

Primary Examiner—Charles A. Ruehl
Attorney—Pravel, Wilson & Matthews

[57] ABSTRACT

Apparatus for indicating the torque applied to a rotated member, particularly pipe rotated by a rotary table in the drilling of a well, wherein the apparatus is connected to the drive shaft of the rotary table, and power to the rotary table is supplied through the apparatus.

9 Claims, 7 Drawing Figures

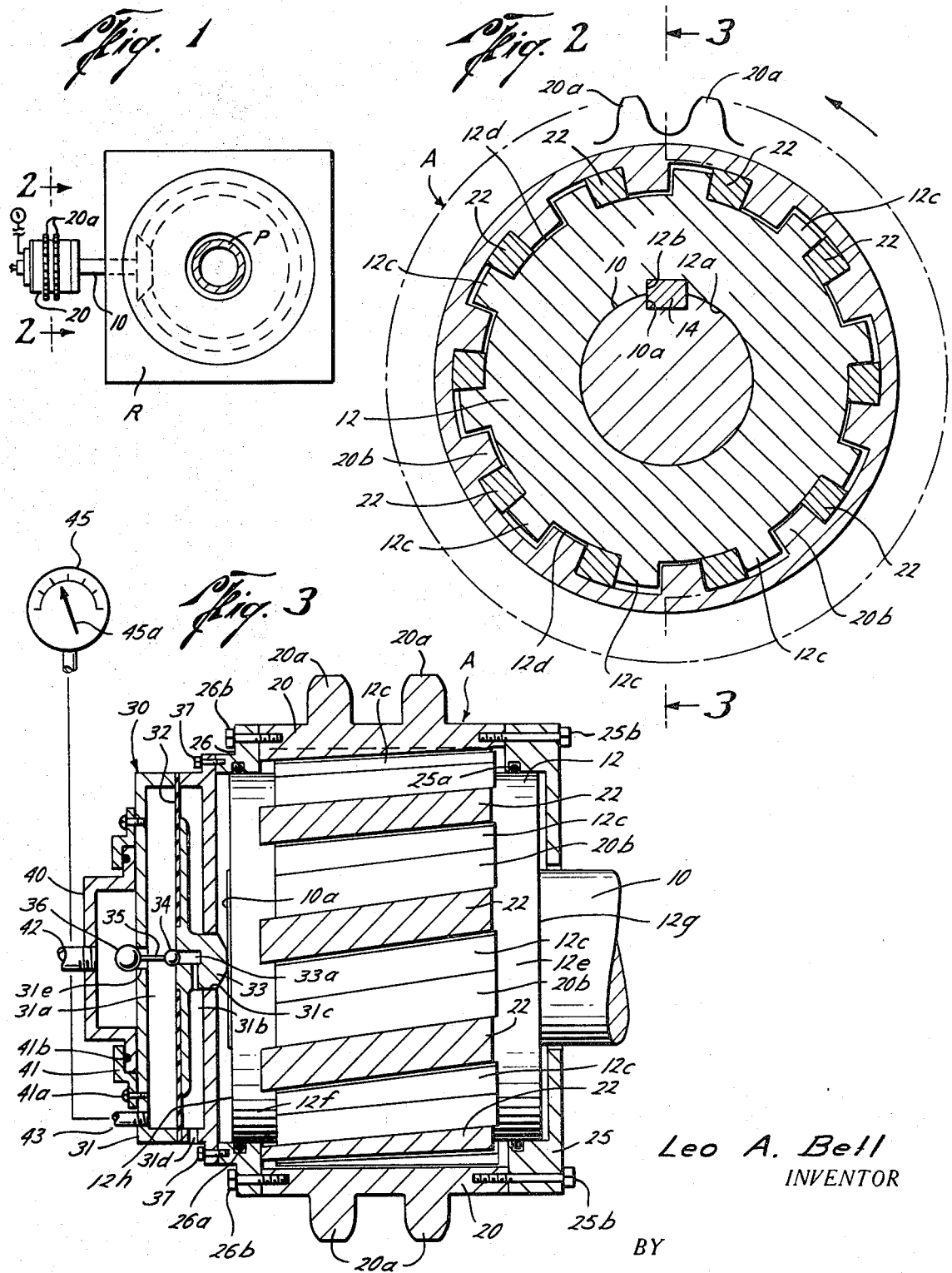

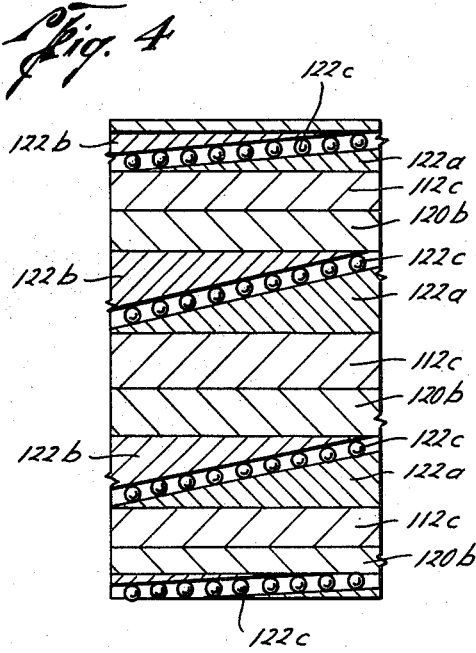
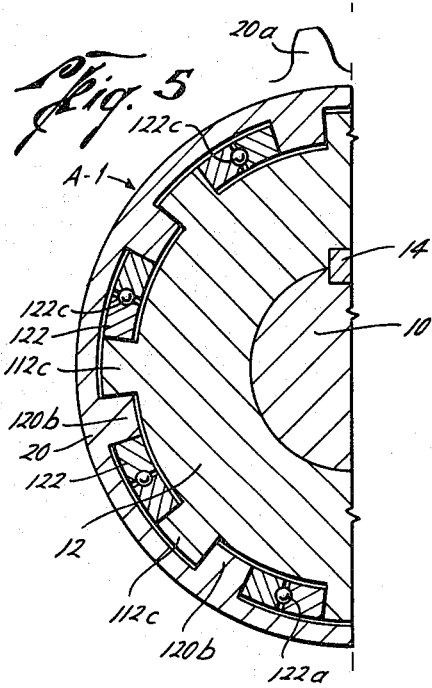
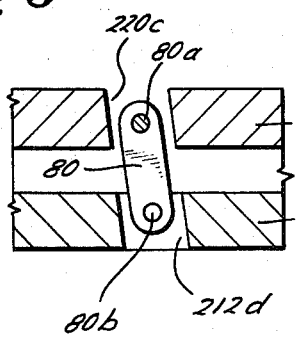
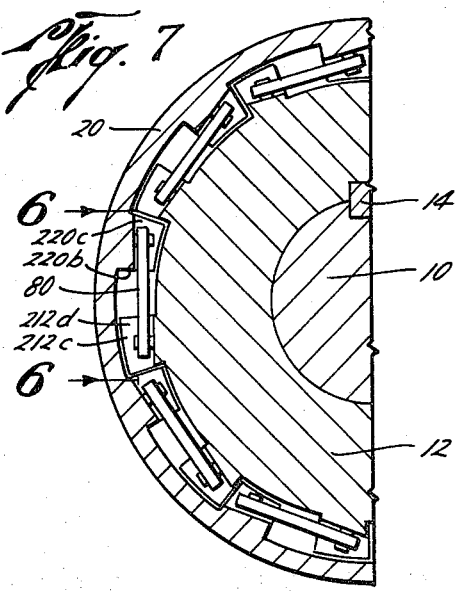
Leo A. Bell
INVENTOR
BY
Pravel Wilson & Matthews
ATTORNEYS

1

APPARATUS FOR INDICATING TORQUE APPLIED TO PIPE ROTATED BY A ROTARY TABLE

BACKGROUND OF THE INVENTION

The field of this invention is apparatus for indicating torque applied to a pipe, shaft, or other member.

In the past, torque which has been applied to gear systems as in U.S. Pat. Nos. 2,386,367; and 2,899,822; and to ball screw and nut assemblies as in U.S. Pat. No. 3,230,762 has been indicated. Torque analyzers such as disclosed in U.S. Pat. No. 2,741,118 are also known. Various types of measuring and indicating devices have been used in connection with drilling rigs, an example of which is shown in U.S. Pat. No. 3,382,713. However, despite such general information with respect to torque, and the specific other measurement applications in connection with drilling rigs, so far as is known, no one has ever heretofore invented an apparatus for indicating the torque applied to drill pipe by the rotary table.

SUMMARY OF THE INVENTION

The present invention relates to an apparatus for indicating the torque applied to pipe rotated by a rotary table for the drilling of a well or for similar operations. By such indication of the torque applied to pipe, the driller or operator may detect changes in the formations encountered by the drill bit, and he will be able to avoid the application of excessive torque to the pipe which might permanently twist or deform the pipe, or even shear it, thereby avoiding dangerous conditions of the pipe which might not otherwise be known to the driller or operator.

BRIEF DESCRIPTION OF THE DRAWINGS

FIG. 1 is a plan view of the apparatus of this invention, including a conventional rotary table in combination with the apparatus for indicating torque applied to pipe rotated by the rotary table;

FIG. 2 is a sectional view taken on line 2—2 of FIG. 1 to illustrate in particular one form of the apparatus of this invention;

FIG. 3 is a view taken on line 3—3 of FIG. 2 to illustrate further details of the first form of this invention;

FIG. 4 is a sectional view taken on line 4—4 of FIG. 5, illustrating another form of the invention;

FIG. 5 is a partial sectional view corresponding to FIG. 2, but illustrating another embodiment of the present invention;

FIG. 6 is a sectional view taken on line 6—6 of FIG. 7; and

FIG. 7 is a partial sectional view, corresponding to FIG. 5, but showing a still further embodiment of the present invention.

DESCRIPTION OF THE PREFERRED EMBODIMENTS

In the drawings, the letter A designates generally the apparatus of this invention which is adapted to be connected to a drive shaft 10 of a rotary table R of conventional construction. The rotary table R is adapted to rotate drill pipe P for the drilling of a well in the usual manner. Briefly, the apparatus A is adapted to be driven by a conventional chain from a drawworks (not shown) so as to transmit through the apparatus A the power to drive the rotary table R and thus to rotate the pipe P. The apparatus A is so constructed that an indication of the torque applied to the drill pipe P by the rotary table R is indicated.

The apparatus A includes a hub 12 which has a central bore 12a for receiving the rotary table drive shaft 10. The hub 12 is secured to the drive shaft 10 by a locking key 14 which is positioned in a keyway 10a in the drive shaft 10 and a similar keyway 12b in the hub 12. The key 14 is preferably forced into the keyways 10a and 12b so as to prevent both rotational movement and longitudinal movement of the hub 12 relative to the shaft 10.

In the form of the invention illustrated in FIGS. 2 and 3, the hub 12 is provided with a central splined section having spaced inclined splines 12c therewith. As will be explained, the splines 12c project externally from the hub 12 and are spaced circumferentially with respect to each other so as to form inclined grooves or recesses 12d therebetween. The splines 12c are inclined with respect to the longitudinal axis of the central bore 12a of the hub 12 and the central longitudinal axis of the drive shaft 10.

An outer sprocket sleeve 20 having sprocket teeth 20a so as to receive a conventional chain from a drawworks, surrounds the hub 12. The sprocket sleeve 20 has a plurality of inwardly extending splines 20b which fit into, and partially fill the grooves 12d in the hub 12 (FIG. 2). The splines 20b are inclined at the same, or substantially the same, angle as the splines 12c, but are spaced therefrom and receive therebetween antifriction thrust bearings 22 which are formed on any suitable antifriction material such as phosphor-bronze.

It is to be noted that the width of the sprocket sleeve 20 is slightly greater than the width of the splines 20b and 12c and the width of the bearings 22. It should also be pointed out that the hub 12 has cylindrical end surfaces 12e and 12f which are of a reduced diameter compared to the diameter in which the external surfaces of the splines 12c lie, thereby forming annular ends 12g and 12h at the outer extremities of the hub 12.

A retainer ring 25 is secured to the end of the sprocket sleeve 20 which is closest to the rotary table R and it serves to limit the movement of the sprocket sleeve 20 in a direction to the left as viewed in FIG. 3, due to the engagement of the retainer ring 25 with the end 12g of the hub 12. A suitable seal such as an O-ring 25a is disposed in the retainer ring 25 for engagement with the external cylindrical surface 12e of the hub 12 to retain grease within the area of the splines 12c and 20b.

At the left end of the sleeve 20, a similar retainer ring 26 is secured to the sleeve 20 to limit the extent of movement of the sprocket sleeve 20 in the right hand direction (as viewed in FIG. 3) by the engagement thereof with the end 12h of the hub 12. A seal such as an O-ring 26a is mounted with the retainer ring 26 for also confining lubricant such as grease within the area of the splines 12c and 20b. The retainer rings 25 and 26 are secured to the sleeve 20 by any suitable means such as screws or bolts 25b and 26b, respectively.

An indicator means or unit 30, which may be of known construction, includes a housing 31 having a flexible diaphragm 32 supported therein so as to divide the housing into chambers 31a and 31b. The diaphragm 32 has a portion thereof of inherent flexibility such as rubber to which is connected a piston or projecting element 33 which moves with the diaphragm 32. The element or piston 33 extends through an opening 31c in the housing 31. A passage 33a is formed in the piston 33 for establishing communication from the chamber 31a to the chamber 31b, and then to the atmosphere through an outlet port 31d. The passage 33a is closed by a valve element 34 which is connected by a rod 35 to another valve 36. The valve 36 is adapted to close a passage 31e which is in the chamber 31a for supplying air to such chamber 31a when the valve 36 is unseated with respect to the opening 31e.

Air is supplied to the chamber 31a through the port 31e when the valve 36 is unseated, preferably through a swivel inlet or chamber 40 which is swivel-mounted so as to remain stationary when the housing 30 is rotated. The swivel mounting is accomplished by any suitable means, such as a retainer ring 41 which is secured to the housing 30 by bolts or screws 41a or other suitable means. An O-ring 41b or other sealing means is provided to prevent the loss of air during the relative rotation of the housing 30 with respect to the swivel inlet or chamber 40. The swivel inlet or chamber 40 has an air supply line 42 connected therewith and with a suitable source (not shown) of air under pressure. A signal line 43 extends from the chamber 31a and is connected by a flexible line (not shown) to a gauge 45 which is located at any suitable point, generally remote from the apparatus A, at the driller's instrument console (not shown). The gauge 45 has a pointer 45a and is calibrated so as to show readings in pounds per square inch of air pressure, or it may be calibrated to read in foot pounds of torque which is applied to the drill pipe P. In either event, the pointer 45a will indicate the relative amount of torque being applied to the drill pipe P by the rotary table R. It will be appreciated that other types of gauges or indicators, including marking pen or stylus types, may be utilized for a permanent and continuous record if so desired.

The housing 30 is attached to the retainer ring 26 by means of bolts 37, or any other suitable securing means so that the housing 30 moves with the sprocket sleeve 20 in a longitudinal direction relative to the longitudinal axis of the drive shaft 10. Also, the housing 30 rotates with the sprocket sleeve 20, but the swivel inlet 40 and the supply line 42 and the signal line 43 remain stationary.

In the operation or use of the apparatus A of this invention, it is secured to the outer end of the drive shaft 10 of a conventional rotary table R, with the piston 33 in engagement with the end 10a of the drive shaft 10 (FIG. 3). The piston 33 continues to remain in constant engagement with the end 10a of the drive shaft 10 during the movements of the rest of the apparatus, as will be more evident hereinafter.

The sprocket teeth 20a are engaged with the drawworks chain so that the sprocket sleeve 20 is driven by the drawworks, and the rotation thereof is transmitted through the splines 20b and the bearing 22 to the splines 12c of the hub 12 to thereby impart rotation to the drive shaft 10 which is connected to the hub 12.

Additionally, depending upon the resistance developed due to the torque on the pipe P during the rotation thereof with the rotary table R, the sprocket sleeve 20 tends to move in a longitudinal direction (either right or left in FIG. 3), but the extent of the longitudinal movement is limited because of the inclination of the coacting splines 20b, 12c and the bearing members 22 therebetween. Thus, as the torque on the drill pipe P increases, there is a tendency for the sprocket 20 to move further to the right as viewed in FIG. 3, whereas, as the torque on the drill pipe P decreases, there is a tendency for the sleeve 20 to move to the left as viewed in FIG. 3. The extent of such movement in either direction is not great, but it is sufficient to affect the situation with respect to the indicator apparatus or unit 30.

For example, when the sprocket 20 moves to the right, it moves relative to the hub 12 and it moves the housing 30 therewith. The piston or projection 33, on the other hand, cannot move to the right with the housing 30 because it is engagement with the shaft 10 which does not move to the right. Thus, when the housing 30 moves to the right from the position shown in FIG. 3, the valve 36 is unseated because the housing 30 in effect moves away from the valve 36 to open the port 31e to permit air pressure from the supply line 42 to enter the chamber 31a. The valve 34 remains seated so that the passage 33a is closed while air is being admitted into the chamber 31a so that the pressure within the chamber 31a increases and acts to force the housing 30 back to the left, carrying with it the sprocket 20, until the valve element 36 has again seated to close the passage 31e. Upon a reseating of the valve 36, the pressure within the swivel inlet or chamber 40 has increased to the same extent as the pressure within the chamber 31a and this is indicated through the signal tube 43 at the gauge 45 so that the operator can visually see that there has been an increase in the torque on the drill pipe P.

When the torque on the drill pipe P decreases, the housing 30 and the sprocket sleeve 20 are moved to the left as viewed in FIG. 3 by the pressure in the chamber 31a. Since the valve element 36 is movable to the left with the housing 30 and it is connected through the stem 35 to the valve element 34, such movement of the housing 30 to the left causes an unseating of the valve element 34 to open the passage 33a which discharges some of the air pressure in the chamber 31a through the passage 33a and outwardly to atmosphere through the port 31d. When the pressure in the chamber 31a drops sufficiently, the housing 30 moves to the right again and ultimately the valve element 34 is seated so that further movement of the housing 30 at that time is prevented. It is to be noted that the air pressure in the chamber 40 is at all times greater than the signal pressure in the chamber 31a.

Thus, the gauge 45 or other suitable indicator connected to the chamber 31a continuously indicates the air pressure changes within the chamber 31a, which changes are proportional to the changes in the torque applied to the drill pipe P. It should also be noted that when the pressure dropped in the chamber 31a, the housing 30 and the sleeve 20 moved back to the right to a substantially center position again. Thus, the sleeve 20 may move back and forth relatively short distances with respect to the hub 12 and the shaft 10 in a longitudinal direction as the torque on the drill pipe P varies. A constant indication of the torque on the drill pipe P is thus obtained at the gauge 45 or other suitable indicator means.

In FIGS. 4 and 5, a modified apparatus A-1 is illustrated, wherein like parts as compared to FIGS. 1-3 bear like numerals and/or letters. Thus, the hub 12 in FIGS. 4 and 5 is the same as hub 12 of FIGS. 2 and 3, and the sprocket sleeve 20 is the same in both forms of the invention. However, the force-transmitting means is modified in that splines 112c and 120b are different from the corresponding splines 12c and 20b. The splines 112c and 120b are not inclined with respect to the longitudinal axis of the shaft 10. Also, in FIGS. 4 and 5, the bearing members 22 have been omitted, and in place thereof, special bearings 122 have been substituted. Each of the bearings 122 is provided with a pair of bearing races 122a and 122b which are formed with inclined grooves for receiving a plurality of roller or ball bearings 122c. Such construction provides the same effect as the inclined splines 12c and 20b illustrated in FIGS. 2 and 3 since torque forces applied to the sprocket sleeve 20 of FIGS. 4 and 5 causes a longitudinal relative movement of the sleeve 20 with respect to the fixed hub 12 in the same manner as heretofore described in connection with FIGS. 2 and 3.

In FIGS. 6 and 7, another modified form of the invention is illustrated, wherein parts which are similar to those of FIGS. 2 and 3 bear like numerals and/or letters. The force-transmitting means is again modified by providing the sleeve 20 and the hub 12 with straight splines or ribs 212c and 220b instead of the inclined splines 12c and 20b of FIGS. 2 and 3. The ribs 220b and 212c are spaced apart from each other and are interconnected by pivoted links 80 which are pivotally connected at pivot pins 80a and 80b. The links 80 fit within suitable inclined slots 220c and 212d in the ribs 220b and 212c, respectively. The links 80 are disposed at an angle to a radial plane passing through the sleeve 20 so that as torque is applied to the drill pipe P, there is a tendency for the links 80 to move to a straight position in the radial plane passing through the shaft 10, and such movement causes a longitudinal shifting of the sleeve 20 in FIGS. 6 and 7 in the same manner as the longitudinal shifting of the sleeve 20 in FIGS. 2 and 3. Thus, the operation of the sleeve 20 and the indications at the gauge 45 are the same in the modified forms of the invention illustrated in FIGS. 4-7 as that explained heretofore in connection with FIGS. 2 and 3.

It should be understood that the various force-transmitting means which are disclosed in the various embodiments in the drawings provide for interconnecting the sleeve 20 with the hub 12, and such illustrated means are merely exemplary, since other forms thereof may be provided for accomplishing the same result heretofore described in connection with FIGS. 2 and 3.

It should be emphasized that, although the invention has been specifically described for indicating torque variations in drill pipe, the invention has a much broader field of use, since it can be used for indicating torque applied to driven shafts and other rotated members in various systems and arrangements.

The foregoing disclosure and description of the invention are illustrative and explanatory thereof, and various changes in the size, shape, and materials as well as in the details of the illustrated construction may be made without departing from the spirit of the invention.

I claim:

1. Apparatus for indicating variations in torque applied to a rotated member, comprising:
a hub having means for connecting to a rotated member;
an outer sleeve surrounding said hub;
force-transmitting means interconnecting said sleeve with said hub for transmitting rotational movement of said sleeve to said hub;
said force-transmitting means having means therewith for moving said sleeve longitudinally relative to said hub in amounts proportionate to torque forces applied to the rotated member from said sleeve;
indicator means for indicating a reading corresponding to the torque loads applied to the rotated member;
said indicator means including:
a housing connected to said sleeve for movement therewith and having a flexible diaphragm therein;
a piston carried by said diaphragm for constant engagement with one end of the rotated member;
a valve operable by movements of said housing relative to said diaphragm for admitting and discharging air with respect to said housing in accordance with the movements of said housing so as to adjust the air pressure in said housing in accordance with the longitudinal movements of said sleeve and thereby in accordance with the torque applied to the rotated member.

2. The structure set forth in claim 1, wherein said means with said force-transmitting means for moving said sleeve longitudinally includes:
means for causing said sleeve to move at an angle as it moves longitudinally with respect to the longitudinal axis of said hub, the extent of such movement depending upon the torque forces developed.

3. The structure set forth in claim 2, wherein said last-mentioned means includes:
co-acting inclined splines on said hub and said sleeve.

4. The structure set forth in claim 2, wherein said last-mentioned means includes:
co-acting inclined splines on said hub and said sleeve; and
an anti-friction thrust bearing disposed between adjacent ones of said splines to facilitate said longitudinal angular movements of said sleeve relative to said hub.

5. The structure set forth in claim 2, wherein said last-mentioned means includes:
co-acting splines on said sleeve and said hub; and
a bearing disposed between adjacent ones of said splines and having an inclined race and bearing elements therein.

6. The structure set forth in claim 2, wherein said last-mentioned means includes:
co-acting splines on said sleeve and said hub; and
a pivoted link interconnecting adjacent ones of said splines.

7. The structure set forth in claim 1, including:
a swivel inlet connected to said housing; and
an air pressure supply line connected to said swivel inlet, whereby said housing rotates with said sleeve while said swivel and supply line remain stationary.

8. Apparatus for indicating variations in torque applied to a drill pipe by a rotary table having a rotary table drive shaft extending therefrom, comprising:
a hub having a hollow bore for receiving the rotary table drive shaft;
an annular sprocket sleeve surrounding said hub and having sprocket teeth on its external surface for engagement by a drawworks chain for rotating said sleeve;
force-transmitting means interconnecting said sleeve with said hub for transmitting rotational movement of said sleeve to said hub;
said force-transmitting means having means therewith for effecting movements of said sleeve relative to said hub in amounts proportionate to torque forces applied through said sleeve to said hub and then to a drill pipe in a rotary table;
indicator means for indicating a reading corresponding to the torque loads applied to the drill pipe by the rotary table;
said indicator means including: a housing connected to said sleeve for movement therewith and having a flexible diaphragm therein;
a piston carried by said diaphragm for constant engagement with one end of the drive shaft;
a valve operable by movements of said housing relative to said diaphragm for admitting and discharging air with respect to said housing in accordance with the movements of said housing so as to adjust the air pressure in said housing in accordance with the longitudinal movements of said sleeve and thereby in accordance with the torque applied to the drive shaft.

9. The structure set forth in claim 8, including: a rotary table having a rotary drive shaft therewith; and means connecting said rotary drive shaft to said hub.

* * * * *